United States Patent
Shimojou et al.

(10) Patent No.: US 10,285,063 B2
(45) Date of Patent: May 7, 2019

(54) SERVICE ALLOCATION DETERMINATION DEVICE AND SERVICE ALLOCATION DETERMINATION METHOD

(71) Applicant: NTT DOCOMO, INC., Chiyoda-ku (JP)

(72) Inventors: Takuya Shimojou, Chiyoda-ku (JP); Motoshi Tamura, Chiyoda-ku (JP); Yusuke Takano, Chiyoda-ku (JP); Ashiq Khan, Chiyoda-ku (JP); Shigeru Iwashina, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 15/556,519

(22) PCT Filed: Mar. 11, 2016

(86) PCT No.: PCT/JP2016/057831
§ 371 (c)(1),
(2) Date: Sep. 7, 2017

(87) PCT Pub. No.: WO2016/152588
PCT Pub. Date: Sep. 29, 2016

(65) Prior Publication Data
US 2018/0041904 A1 Feb. 8, 2018

(30) Foreign Application Priority Data
Mar. 20, 2015 (JP) .................. 2015-058508

(51) Int. Cl.
*H04W 16/02* (2009.01)
*H04W 88/18* (2009.01)
*H04W 28/26* (2009.01)

(52) U.S. Cl.
CPC .......... *H04W 16/02* (2013.01); *H04W 28/26* (2013.01); *H04W 88/18* (2013.01)

(58) Field of Classification Search
CPC combination set(s) only.
See application file for complete search history.

(56) References Cited

U.S. PATENT DOCUMENTS

2013/0007232 A1 1/2013 Wang et al.
2013/0212285 A1* 8/2013 Hoffmann ........... H04L 12/4641
709/226

(Continued)

FOREIGN PATENT DOCUMENTS

WO WO 2016/074702 5/2016

OTHER PUBLICATIONS

Extended European Search Report dated Jan. 12, 2018 in Patent Application No. 16768491.9, citing references AA-AD, AO, and AX-AY therein, 14 pages.

(Continued)

*Primary Examiner* — Dady Chery
(74) *Attorney, Agent, or Firm* — Oblon, McClelland, Maier & Neustadt, L.L.P.

(57) ABSTRACT

A service allocation determination device and service allocation determination method that can allocate a service to a slice without wasteful use of resources. In a BSS/OSS, a service request receiving unit receives service requirements and information indicating functions for implementing a service. An allocation determination unit, using the service requirements and slice information, determines whether to allocate the service to an existing slice or to a new slice. An allocation request unit makes a request to allocate the service to the slice determined by the allocation determination unit. In this case, because the BSS/OSS 10 determines whether to allocate the service to an existing slice or to a new (Continued)

slice based on the service requirements and the attribute of the existing slice, the service can be allocated to a slice without wasteful use of resources.

8 Claims, 14 Drawing Sheets

(56) References Cited

U.S. PATENT DOCUMENTS

| | | | |
|---|---|---|---|
| 2016/0043998 | A1 | 2/2016 | Wang et al. |
| 2017/0325128 | A1 | 11/2017 | Bhattacharjee et al. |

OTHER PUBLICATIONS

Chengchao Liang, et al. "Wireless Network Virtualization: A Survey, Some Research Issues and Challenges", IEEE Communications Surveys & Tutorials, vol. 17, No. 1, XP055303478, 2015, pp. 358-360.

Aleksandra Checko, et al. "Cloud RAN for Mobile Networks—A Technology Overview", IEEE Communications Surveys & Tutorials, vol. 17, No. 1, XP055395586, 2015, pp. 1-24.

Japanese Office Action dated May 29, 2018 in Japanese Patent Application No. 2017-508224 (with unedited computer generated English translation), 7 pages.

Written Opinion of the International Searching Authority dated May 31, 2016 in PCT/JP2016/057831 with English translation.

International Search Report dated May 31, 2016 in PCT/JP2016/057831.

International Preliminary Report on Patentability dated Sep. 21, 2017 in PCT/JP2016/057831.

International Search Report dated Apr. 11, 2017 in PCT/JP2016/057831 (with translation of categories of cited documents).

Hirotada Honda, et al., "On an Effecive Resource Allocation to Virtual Networks", Proceedings of the 2015 IEICE General Conference Tsushin 2, 2015, p. 457 (with partial English language translation).

Akihiro Nakao, "Virtualization-node project: Virtualization technology for new generation network", National Institute of Information and Communications Technology, 2010, 19 pages (with English language translation).

Naohiko Shibuta et al., "Dynamic Transmission Route Selection Towards the Contents Transmission Energy Optimization in E3-DCN", The Institute of Electronics, Information and Communication Engineers, 2012, pp. 99-104 (with English abstract and Partial English language translation).

Tsuyoshi Ogura et al., "A method for congestion avoidance using multiple virtual networks", The Institute of Electronics, Information and Communication Engineers, 2017, 13 pages (with English abstract and Partial English language translation).

Kiyohide Nakauchi et al., "A Design of Service-aware Mobile Network Virtualization", The Institute of Electronics, Information and Communication Engineers, Network Research Headquarters National Institute of Information and Communications Technology, 2012.9, pp. 105-110, (with English abstract and Partial English language translation).

Office Action dated Aug. 28, 2018 in Japanese Patent Application No. 2017-508224 (with English language translation).

\* cited by examiner

Fig. 4

SLICE MANAGEMENT TABLE

| SLICE ID | AVAILABLE NODE | CAPABILITY OF MOBILITY CONTROL | POSSIBLE ACCESS AREA RANGE | SERVICE USE TIME | AVAILABLE BANDWIDTH | MINIMUM DELAY TIME | MINIMUM PACKET LOSS | RESOURCE UTILIZATION RATE | FLAG FOR AVAILABILITY OF RECEIPT OF MULTIPLE SERVICES |
|---|---|---|---|---|---|---|---|---|---|
| Slice1 | SERVER SV1, SWITCH SW1,... | CAPABLE | KANTO AREA | 24H AVAILABLE | 1G | 3s | 2% | 30% | 0 |

Fig.5

HARDWARE TABLE

| HW NAME | AMOUNT OF RESOURCES | AMOUNT OF ELECTRICITY |
|---|---|---|
| SERVER 1 | 4Core, 2GB | OOW |

*Fig.6*

SERVICE MANAGEMENT TABLE

| SERVICE ID | MOBILITY CONTROL | ACCESS AREA RANGE | SERVICE USE TIME | ALLOWABLE LOWER LIMIT BANDWIDTH | ALLOWABLE DELAY TIME | ALLOWABLE PACKET LOSS | FUNCTION | ISOLATION FLAG |
|---|---|---|---|---|---|---|---|---|
| SERVICE 1 | NEED | TOKYO | 10:00~22:00 | 500M | 30s | 2% | USER AUTHENTICATION, VIDEO DISTRIBUTION | 0 |

*Fig.7*

SERVICE CORRESPONDENCE SLICE
MANAGEMENT TABLE

| SERVICE ID | SLICE ID |
|---|---|
| SERVICE 1 | Slice1 |

| SLICE ID | AVAILABLE NODE | CAPABILITY OF MOBILITY CONTROL | POSSIBLE ACCESS AREA RANGE | SERVICE USE TIME | AVAILABLE BANDWIDTH | MINIMUM DELAY TIME | MINIMUM PACKET LOSS | RESOURCE UTILIZATION RATE | FLAG FOR AVAILABILITY OF RECEIPT OF MULTIPLE SERVICES |
|---|---|---|---|---|---|---|---|---|---|
| Slice1 | SERVER SV1, SERVER SV2. | CAPABLE | KANTO AREA | 24H AVAILABLE | 1G | 3s | 2% | 30% | 0 |

(B)

| SLICE ID | AVAILABLE NODE | CAPABILITY OF MOBILITY CONTROL | POSSIBLE ACCESS AREA RANGE | SERVICE USE TIME | AVAILABLE BANDWIDTH | MINIMUM DELAY TIME | MINIMUM PACKET LOSS | RESOURCE UTILIZATION RATE | FLAG FOR AVAILABILITY OF RECEIPT OF MULTIPLE SERVICES |
|---|---|---|---|---|---|---|---|---|---|
| Slice1 | SERVER SV1, SWITCH SW1,... | CAPABLE | KANTO AREA | 24H AVAILABLE | 1G | 3s | 2% | 30% | 0 |
| Slice2 | SERVER SV5, SWITCH SW10,... | CAPABLE | KOUSHINETSU AREA | 24H AVAILABLE | 1G | 3s | 2% | 30% | 0 |

| SERVICE ID | SLICE ID |
|---|---|
| SERVICE 1 | Slice1 |
| SERVICE 2 | Slice2 |

(B)

| SERVICE ID | SLICE ID |
|---|---|
| SERVICE 1 | Slice1 |
| SERVICE 2 | Slice1 |

*Fig.10*

RESOURCE UTILIZATION STATUS TABLE

| HW NAME | SLICE BEING USED | ALLOCATED RESOURCES | EXCESS RESOURCES | RESOURCE UTILIZATION RATE |
|---|---|---|---|---|
| SERVER 1 | Slice1<br>Slice2 | 1Core, 500MB<br>1Core, 500MB | 2Core, 1GB | 20%<br>20% |

SERVICE ALLOCATION DETERMINATION DEVICE AND SERVICE ALLOCATION DETERMINATION METHOD

TECHNICAL FIELD

The present invention relates to a service allocation determination device and a service allocation determination method.

BACKGROUND ART

A network system using existing virtualization technology virtually divides hardware resources to create slices, which are virtual networks that are logically constructed on a network infrastructure, with use of the virtualization technology disclosed in Non Patent Literature 1. The system then allocates a service to each of the slices and thereby provides the service using a network in each of the slices that are isolated from one another. Thus, when allocating a slice to each of services having a variety of requirements, it is possible to easily satisfy the requirement of each service and thereby reduce the signaling loads and the like.

CITATION LIST

Non Patent Literature

NPL1: Akihiro Nakao, "Virtualization-node project: Virtualization technology for new generation network", [online], June 2010, National Institute of Information and Communications Technology, [Searched on Mar. 16, 2015], Internet <http://www.nict.go.jp/publication/NICT-News/006/01.html>

SUMMARY OF INVENTION

Technical Problem

However, when allocating a slice to each of services, one slice has all resources in the slice to itself, which decreases the statistical multiplexing effect, and a division loss occurs due to allocating fixed resources to each slice in order to ensure to meet each of service requirements, which causes overall resource degradation.

The present invention has been accomplished to solve the above problems and an object of the present invention is thus to provide a service allocation determination device and a service allocation determination method that can allocate a service to a slice without wasteful use of resources.

Solution to Problem

To achieve the above object, a service allocation determination device according to one embodiment of the present invention is a service allocation determination device that allocates, to a slice being a virtual network, a service using the virtual network, the device including a service request receiving means for receiving a service request containing service requirements being functional or performance requirements in a service to be provided using the virtual network, an allocation determination means for determining to which of an existing slice and a new slice a service is to be allocated based on service requirements received by the service request receiving means and an attribute of an existing slice, and an allocation request means for making a request for allocating a service to a slice determined by the allocation determination means.

A service allocation determination method according to one embodiment of the present invention is a service allocation determination method performed in a service allocation determination device that allocates, to a slice being a virtual network, a service using the virtual network, the method including a service request receiving, step of receiving a service request containing service requirements being functional or performance requirements in a service to be provided using the virtual network, an allocation determination step of determining to which of an existing slice and a new slice a service is to be allocated based on service requirements received by the service request receiving step and an attribute of an existing slice, and an allocation request step of making a request for allocating a service to a slice determined by the allocation determination step.

According to the above-described service allocation determination device and service allocation determination method, which of an existing slice and a new slice a service is to be allocated to is determined based on the service requirements and the attribute of the existing slice, and it is thereby possible to allocate a service to a slice without wasteful use of resources.

Further, in the above-described service allocation determination device, the allocation determination means may allocate a service to an existing slice on condition that an attribute of the existing slice satisfies the service requirements. Further, the allocation determination step may allocate a service to an existing slice on condition that an attribute of the existing slice satisfies the service requirements. In this case, because the service allocation determination device allocates a service to an existing slice when the service can be added to the existing slice, it is possible to allocate the service to a slice without wasteful use of resources compared with the case of creating a new slice each time receiving a new service request.

Further, in the above-described service allocation determination device, the allocation determination means may allocate a service to an existing slice when the attribute of the existing slice satisfies the service requirements and further a result of comparison between costs when allocating a service to the existing slice and costs when allocating a service to a new slice satisfies specified conditions. Further, when an attribute of an existing slice satisfies the service requirements, the allocation determination step may switch whether to allocate a service to the existing slice or allocate a service to a new slice depending on a result of comparison between an index related to service allocation to the existing slice and an index related to service allocation to a new slice. In this case, because the service allocation determination device compares the costs when allocating a service to an existing slice and the costs when allocating a service to a new slice, it is possible to prevent wasteful use of resources.

Further, in the above-described service allocation determination device, when an attribute of an existing slice does not satisfy the service requirements, the allocation determination means may determine whether to extend resources of the existing slice and allocate a service to the existing slice or allocate a service to a new slice based on a result of comparison between costs when extending resources of the existing slice and costs when creating a new slice. Further, when an attribute of an existing slice does not satisfy the service requirements, the allocation determination step may determine whether to extend resources of the existing slice and allocate a service to the existing slice or allocate a service to a new slice based on a result of comparison between costs when extending resources of the existing slice and costs when creating a new slice. In this case, because a slice is extended and a service is allocated in consideration of the costs for extension, it is possible to prevent wasteful use of resources compared with the case of uniformly creating a new slice.

Further, in the above-described service allocation determination device, the service requirements include an isolation requirement indicating allocation to a slice where another service is not allocated, and when the service requirements received by the service request receiving means include the isolation requirement, the allocation determination mean may determine to allocate a service received by the service request receiving means to a new slice. Further, the service requirements include an isolation requirement indicating allocation to a slice where another service is not allocated, and when the service requirements received by the service request receiving step include the isolation requirement, the allocation determination step may determine to allocate a service received by the service request receiving step to a new slice. In this case, the service allocation determination device can prevent a service requesting allocation to a slice where another service is not allocated from being allocated to a slice where another service is allocated.

Advantageous Effects of Invention

According to one embodiment of the present invention, which of an existing slice and a new slice a service is to be allocated to is determined based on the service requirements and the attribute of the existing slice, and it is thereby possible to allocate a service to a slice without wasteful use of resources.

BRIEF DESCRIPTION OF DRAWINGS

FIG. 4 is a view showing a slice management table.
FIG. 5 is a view showing a hardware table.
FIG. 6 is a view showing a service management table.
FIG. 7 is a view showing a service correspondence slice table.
FIG. 8 is a view showing a change in a slice management table.
FIG. 9 is a view showing a change in a service correspondence slice management table.
FIG. 10 is a view showing a resource utilization status table.
FIG. 11 is a hardware configuration diagram of BSS/OSS and the like.

DESCRIPTION OF EMBODIMENTS

Embodiments of a service allocation determination device and a service allocation determination method according to the present invention are described hereinafter with reference to the drawings. Note that, in the description of the drawings, the same elements are denoted by the same reference symbols and redundant description thereof is omitted.

Figure 1:
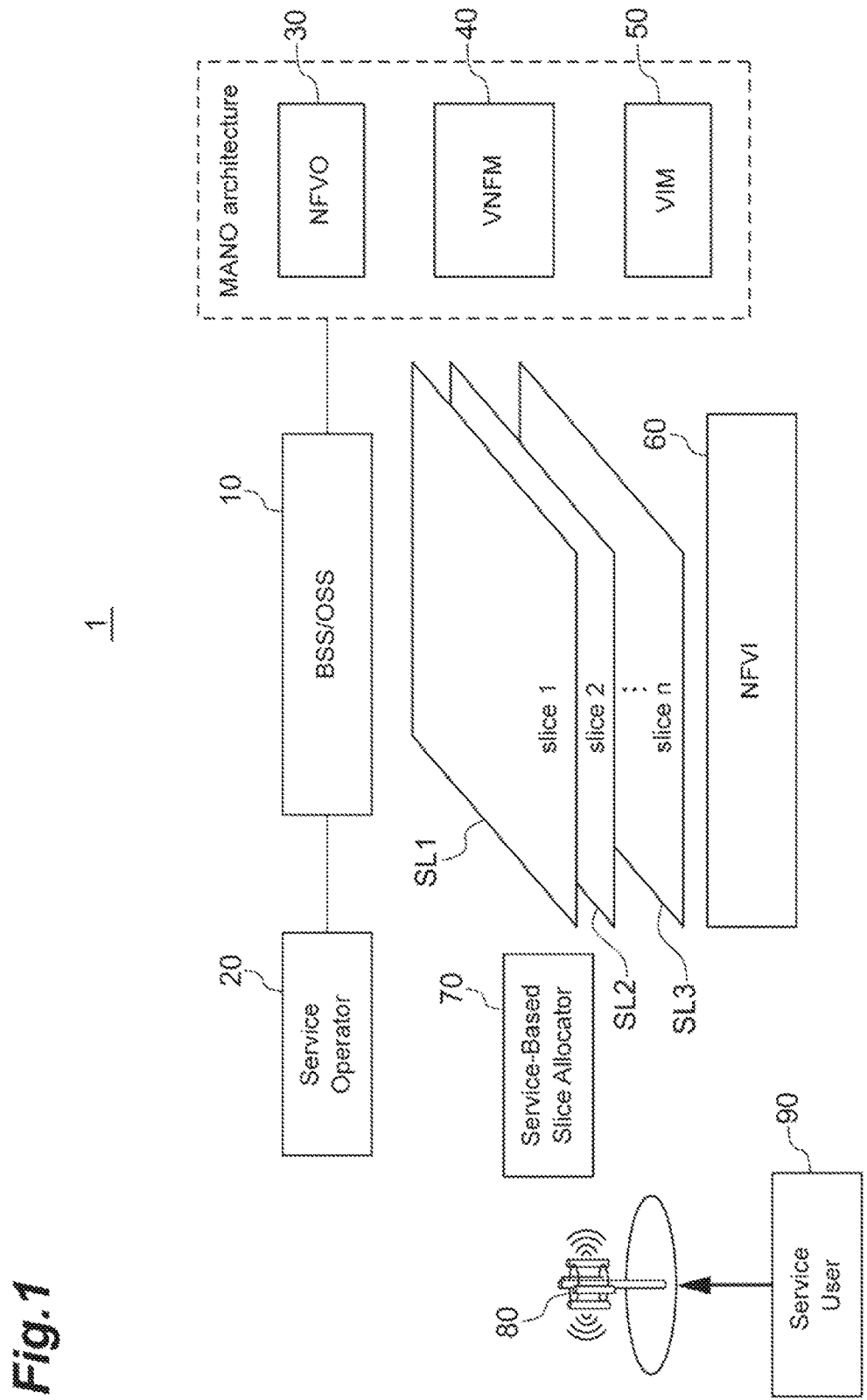
FIG. 1 is a view showing the configuration of a system according to an embodiment of the present invention.

FIG. 1 shows the configuration of a system 1 (service allocation determination device) that includes a BSS/OSS 10 according to this embodiment. The system 1 is a system that allocates a service to a slice, which is a virtual network. The slice is a virtual network or service network that is logically created on a network infrastructure by virtually dividing link and node resources of a network device and coupling the divided resources, and resources in the slices are isolated from one another and do not interfere with one another. The service is a service using network resources such as a communication service (a leased line service etc.) and an application service a video distribution service, a service using a sensor device such as an embedded device etc.).

As shown in FIG. 1, the system 1 is composed of BSS/OSS (Operations Support System/Business Support System) 10, SO (Service Operator) 20, NFVO 30, VNFM 40 and VIM (Virtualized Infrastructure Management) 50. Further, the system 1 is composed of NFVI (NFV (Network Functions Virtualisation) Infrastructure) 60, SBSA (Service-Based Slice Allocator) 70, base station 80, and SU (Service User) 90. The NFVO 30, the VNFM 40 and the VIM 50 are MANO (Management & Orchestration) architecture.

Those elements constitute a core network of the system 1. Note that the elements that need to transmit and receive information to and from each other are connected by wired connections or the like so that they can transmit and receive information.

The system 1 according to this embodiment provides a communication function to a mobile communication terminal by a virtual server that operates in a virtual machine which is implemented on a physical server. Specifically, the system 1 is a virtualized mobile communication network. The communication function is provided to the mobile communication terminal by executing communication processing corresponding to the communication function by the virtual machine.

The NFVI 60 is a network that is formed by physical resources (a group of nodes) that constitute a virtualized environment. Conceptually, the physical resources include computational resources, storage resources and transmission resources. The physical resources are composed of nodes such as a physical server, which is a physical server device that performs communication processing in the system 1, and switches. The physical server is composed of a CPU (core, processor), a memory, and a storage means such as a hard disk. Generally, nodes such as physical servers that constitute the NFVI 60 are collectively located in a point such as a data center (DC). In the data center, the physical servers located therein are connected by a network in the data sensor, so that they can transmit and receive information to and from each other. Further, there are a plurality of data centers in the system 1. The data centers are connected by a network, and physical servers located in different data centers can transmit and receive information to and from each other through the network.

The SO (Service Operator) 20 is a device that requests a service, and it is, for example, a terminal device e.g., personal computer etc.) of a business operator that provides services to various users with use of virtual networks.

The BSS/OSS 10 is a node that performs service management in the system 1 and gives instructions related to the communication function in the system 1. For example, the BSS/OSS 10 gives an instruction to add a new communication function (communication service) to the NFVO 30. Further, the BSS/OSS 10 can be operated by a telecommunications carrier related to the system 1.

The NFVO 30 is an overall management node (functional entity) that performs management of all virtual networks (slices) constructed on the NFVI 60, which is a physical resource. The NFVO 30 receives an instruction from the BSS/OSS 10 and performs processing in accordance with the instruction. The NFVO 30 performs management of all virtualized networks constructed in the physical resources of the mobile communication network of the infrastructure and communication service. The NFVO 30 implements the communication service that is provided by a virtual network in an appropriate place via the VNFM 40 and the VIM 50. For example, service life cycle management (specifically, creation, update, scale control, event collection, etc.), resource distribution, reservation and allocation management in the entire mobile communication network, service instance management, and policy management (specifically, optimal placement based on resource reservation, allocation, geography, laws and regulations etc.)

The VNFM 40 is a virtual communication function management node (functional entity) that adds a function related to a service to the NFVI 60, which is a physical resource (node). A plurality of VNFMs 40 may be placed in the system 1.

The VIM 50 is a physical resource management node (functional entity) that manages each of physical resources (nodes) in the NFVI 60. Specifically, it performs management of resource allocation, update and collection, association of a physical resource with a virtualized network, and management of a list of hardware resources and SW resources (hypervisor). Generally, the VIM 50 performs management for each data center (exchange). The management of physical resources is performed by a scheme corresponding to the data center. There are several types of management schemes of the data center (implementation schemes of management resources) such as OPENSTACK and vCenter. In general, the VIM 50 is placed for each data center management scheme. Specifically, a plurality of VIMs 50 that respectively manage the physical resources in the NFVI 60 by different schemes from one another are included. Note that the physical resources are not necessarily managed by different schemes for each data center.

Note that the NFVO 30, the VNFM 40 and the VIM 50 are implemented by executing a program on a physical server device (note that, however, the way of implementation on virtualization is not particularly limited, and a management system may be separated and implemented on virtualization). The NFVO 30, the VNFM 40 and the VIM 50 may be implemented by separate physical server devices or may be implemented by the same server device. The NFVO 30, the VNFM 40 and the VIM 50 (i.e. programs for implementing them) may be provided from different vendors.

The NFVO 30 receives a service allocation request from the BSS/OSS 10 and then makes a resource reservation request for slices (slices SL1, SL2 etc.) to the VIM 50. When the VIM 50 reserves resources in a server device and switches that form the NFVIs 60, the NFVO 30 defines slices for those NFVIs 60.

Further, after the NFVO 30 causes the VIM 50 to reserve resources in the NFVI 60, it stores information that defines a slice for the NFVI 60 into a table stored in the NFVO 30. Then, the NFVO 30 makes a request to install software for implementing a function required for the service to the VNFM 40. In response to the installation request, the VNFM 40 installs the software into the NFVI 60 (a node such as a server device, a switch device or a router device) that has been reserved by the VIM 50.

When the software is installed by the VNFM 40, the NFVO 30 associates the slice and the service into the table stored in the NFVO 30.

Figure 2:
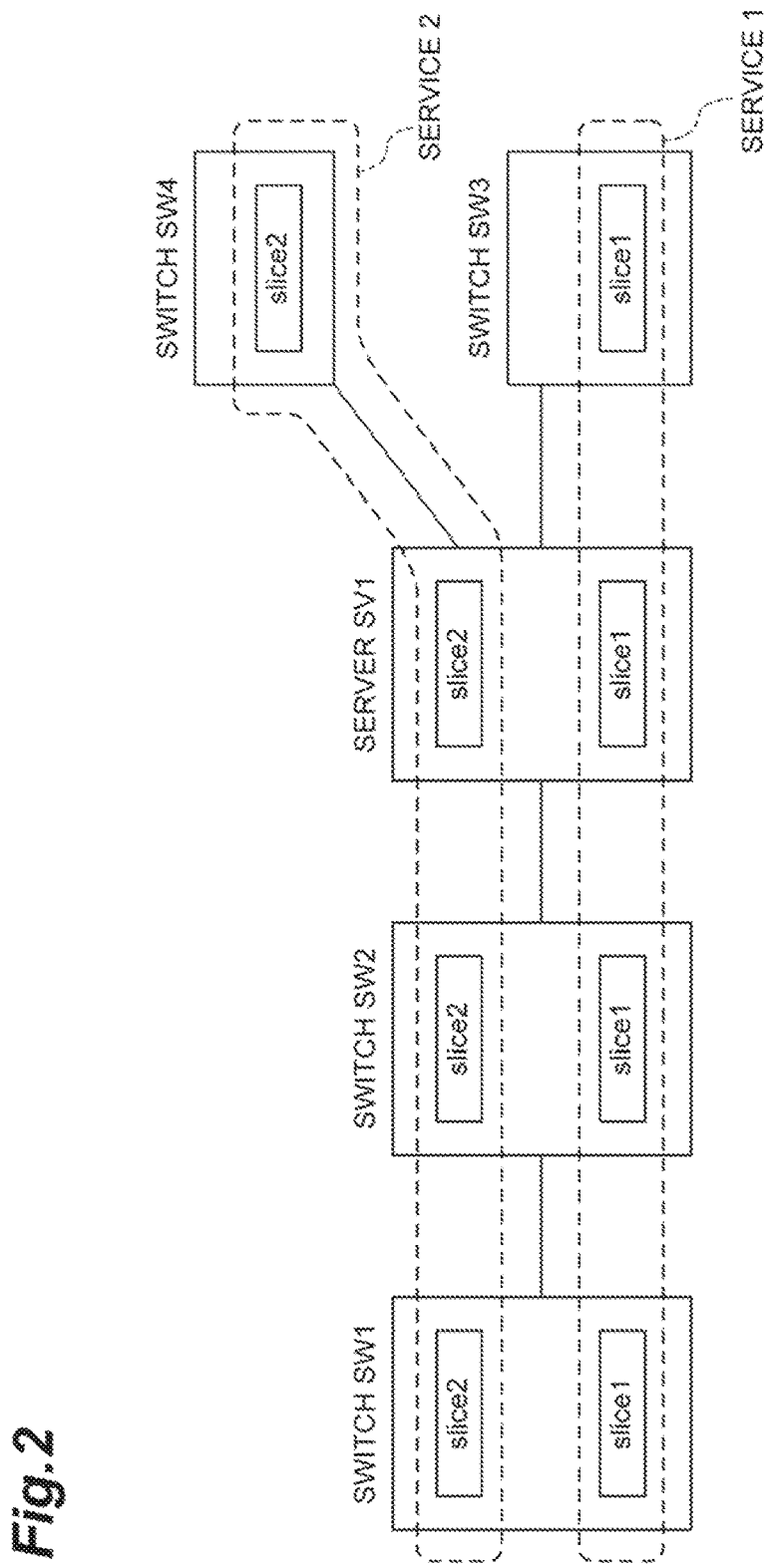
FIG. 2 is a view showing the correspondence between slices and resources.

For example, as shown in FIG. 2, when the NFVO 30 makes a resource reservation request for slices (slice 1 and slice 2) to the VIM 50, the VIM 50 gives an instruction indicating that request to a switch SW1, a switch SW2, a server SV1 and a switch SW3. Then, the switch SW1, the switch SW2, the server SV1 and the switch SW3 reserve resources for the slice 1. Likewise, in accordance with an instruction from the VIM 50, the switch. SW1, the switch SW2, the server SV1 and a switch SW4 reserve resources for the slice 2.

Further, when resources are reserved in switches or the like, the NFVO 30 allocates the service 1 to the slice 1, and allocates the service 2 to the slice 2. In this manner, the NFVO 30 allocates services to the slices that are isolated from one another. Note that a plurality of services may be allocated to each slice.

After the NFVO 30 allocates a service to a slice, it transmits access information that contains the ID of this service and the address (e.g., IP address) of hardware that provides the first function of this service to the BSS/OSS 10.

When the BSS/OSS 10 receives the access information, it notifies each SBSA 70 of the access information. The SBSA 70 is a server device that can communicate with the base station 80, and when a service request is made, with a service ID, from the SU (Service User) 90 to the base station 80, the base station 80 notifies the SBSA 70 of the service ID received from the SU 90.

When the SBSA 70 receives the service ID from the base station 80, it transmits, to the base station 80, the address information of the hardware that provides the first function of the service of the access information corresponding to the service ID received from the base station 80. The base station 80 notifies the SU 90 of this address information. The SU 90 can thereby specify the address to be accessed first to use the service.

Figure 3:
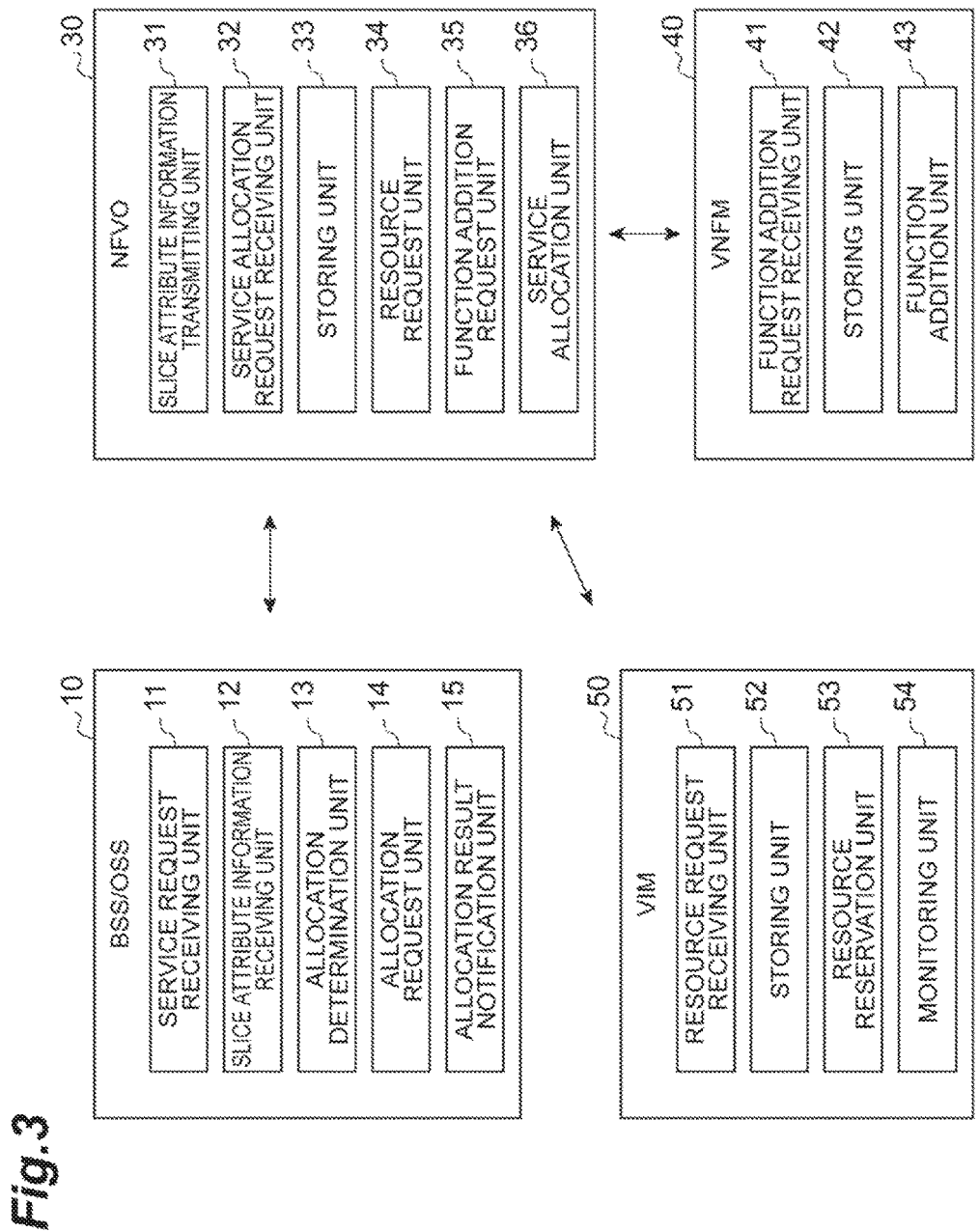
FIG. 3 is a block diagram of devices included in a system according to an embodiment of the present invention.

Hereinafter, the functions related to this embodiment of the BSS/OSS 10, the NFVO 30, the VNFM 40 and the VIM 50 are described with reference to FIG. 3. As shown in FIG. 3, the BSS/OSS 10 includes a service request receiving unit 11 (service request receiving means), a slice attribute information receiving unit 12, an allocation determination unit 13 (allocation determination means), an allocation request unit 14 (allocation request means), and an allocation result notification unit 15.

The service request receiving unit 11 is a part that receives a service request containing service requirements, which are requirements for the function or performance in the service from the SO. Among the service requirements, the functional requirements are requirements related to the function for carrying out the service. To be specific, the functional requirements include the necessity of mobility control, a possible access area range and a service use time. The necessity of mobility control means whether handover control is required or not. The access area range means the range (area) where a service is provided. The service use time means a period of time when a service is used.

The performance requirements are requirements related to the performance of the slice for carrying out the service. To be specific, the performance requirements include an allowed lower limit bandwidth, an allowed delay time, a minimum packet loss rate and the like. The allowed lower limit bandwidth indicates the lower limit of the frequency band to be used for communication, the allowed delay time means the length of time a communication delay is allowed, and the minimum packet loss rate indicates an allowable packet loss rate.

Further, at the time of receiving a service request, the service request receiving unit 11 receives information indicating the function for implementing the service. The information indicating the function for implementing the service includes information for specifying the function (function identifying information, function name etc.). Further, the service request receiving unit 11 may receive software for implementing the function from the SO 20.

When the service request receiving unit 11 receives the above-described service requirements and information indicating the functions for implementing and the service, it transmits the service requirements to the allocation determination unit 13, and transmits the information indicating the functions for implementing and the service (functional information) to the allocation request unit 14. Further, at this timing, the service request receiving unit 11 notifies the slice attribute information receiving unit 12 that the service request has been received. The functional information contains information for identifying a function and software for implementing this function.

The slice attribute information receiving unit 12 is a part that receives slice information from the NFVO 30. To be specific, when the slice attribute information receiving unit 12 receives a notification about the receipt of a service request from the service request receiving unit 11, it sends a request for transmitting slice attribute information to the NFVO 30.

Note that the NFVO 30 stores information of a slice management table containing slice attribute information, and when the NFVO 30 receives a request for transmitting slice information from the slice attribute information receiving unit 12, it transmits information the slice management table to the BSS/OSS 10.

FIG. 4 shows an example of the slice management table stored in the NFVO 30. The slice management table has a slice ID, an available node, the capability of mobility control, a possible access area range, a service use time, an available bandwidth, a minimum delay time, a minimum packet loss rate, a resource utilization rate, and a flag for availability of receipt of multiple services.

The slice ID is an ID for uniquely identifying a record that is determined when the NFVO 30 adds a new record to the slice management table. The available node indicates a node that is reserved by the VIM 50 (a node that constitutes the NFVI 60) as a result of making a resource reservation request to the VIM 50. Information defined by the available node includes information that identifies a node (hardware name etc.) and the amount of resources allocated in each node (a memory occupancy, a CPU occupancy rate etc.). The capability of mobility control is information indicating whether the available node is capable of mobility control or not. The possible access area range is information indicating an accessible area based on the location of the available node. The service use time is information indicating a time when a service is available based on the available node. The available bandwidth is information indicating the maximum bandwidth that can be provided in the available node.

The minimum delay time indicates the minimum delay time based on the available node. The minimum packet loss rate indicates the minimum packet loss rate based on the available resources. The resource utilization rate indicates the utilization rate of resources allocated in the current node.

The flag for availability of receipt of multiple services is a value indicating whether a service that is designated to be isolated from another service is allocated or not, and when a service that is designated to be isolated from another service is allocated, information indicating that (e.g., "1") is set.

When the slice attribute information receiving unit 12 receives information contained in the slice management table from the NFVO 30, it transmits this information to the allocation determination unit 13. Using this information, the allocation determination unit 13 determines whether to allocate the requested service to an existing slice or to a new slice.

The allocation determination unit 13 is a part that determines to which of an existing slice and a new slice the service is to be allocated based on the service requirements of the service received by the service request receiving unit 11 and the attribute of the existing slice. The allocation determination unit 13 receives the service requirements from the service request receiving unit 11 and receives the slice information from the information receiving unit 12 and, using the service requirements and the slice information, determines to which of an existing slice and a new slice the service is to be allocated.

First, in the case where the service requirements include a requirement indicating isolation from another service (isolation requirement), the allocation determination unit 13 determines to allocate the service to a new slice. On the other hand, in the case where the service requirements do not include a requirement indicating isolation from another service, the allocation determination unit 13 determines whether the attribute information of an existing slice that satisfies the service requirements exists or not.

In the case where the attribute information of an existing slice that satisfies the service requirements exists, the allocation determination unit 13 determines whether there is waste by allocating (accommodating) the requested service to this existing slice, and when determining that there is waste, it determines to create a new slice, and when determining that there is no waste, it determines to allocate the service to this existing slice.

When the allocation determination unit 13 determines whether there is waste by allocating (accommodating) the requested service to the existing slice, it determines the presence or absence of waste by allocating the service to the existing slice based on a result of comparing the service operational costs in the existing slice (costs (indicator) needed when allocating the service to the existing slice) with the costs needed when creating a new slice (the sum of costs for creating a slice, operational costs of a newly created slice, and a slice division loss). For example, when the scale and the capacity of the existing slice are set high, the capacity can be excessive depending on a service. The allocation determination unit 13 makes a determination about such a thing by using the concept of costs.

In order to calculate the two costs described above, the allocation determination unit 13 acquires hardware information stored in the VIM 50. To be specific, the allocation determination unit 13 transmits, to the VIM 50, identification information of an available node of the existing slice and makes a request for transmitting hardware information corresponding to the identification information of the available node, and thereby acquires the hardware information.

When the VIM 50 receives a request for transmitting hardware information and identification information of an available node from the BSS/OSS 10, it acquires the hardware information corresponding to the identification information of the available node from the hardware table.

FIG. 5 shows the hardware table stored in the VIM 50. The hardware table is a table that manages hardware information containing an HW name, the amount of resources, and the amount of electricity.

The HW name is identification information of hardware. The amount of resources indicates the amount of resources of the hardware such as a memory capacity and CPU capabilities (number, execution speed etc.). The amount of electricity is the amount of electricity when the entire hardware is used.

The VIM 50 receives the hardware information corresponding to the identification information of the available node from the hardware table and then transmits the information to the BSS/OSS 10.

In the case of adding a service to the existing slice, the allocation determination unit 13 calculates the proportion of resources to be used by adding the service to the overall resources of an available node, and multiplies this proportion by the amount of electrical power used in the available node as a whole. Then, the allocation determination unit 13 calculates the costs for operation corresponding to this value by using the correspondence information between the amount of electrical power and the costs for operation which is prestored in the allocation determination unit 13.

Further, in the case of adding a new slice and associating a slice with it, the allocation determination unit 13 calculates the proportion of resources to be used by adding the service to the overall resources of an available node, and multiplies this proportion by the amount of electrical power used in the available node as a whole. Then, the allocation determination unit 13 calculates the costs for creation and operation corresponding to this value by using the correspondence information between the amount of electrical power and the costs for creation and the correspondence information between the amount of electrical power and the costs for operation which are prestored in the allocation determination unit 13.

Further, the allocation determination unit 13 calculates a division loss based on a predetermined arithmetic expression where a value decreases in inverse proportion to, or with an increase in, the number of users. For example, the value of a division loss is calculated by dividing a predetermined coefficient by the number of users (the value received when requesting a service).

When, as a result that the allocation determination unit 13 compares the service operational costs in the existing slice with the creation costs and the operational costs needed when creating a new slice, the service operational costs in the existing slice are smaller, this means that the costs are smaller when allocating the service to the existing slice than when creating a new slice. In this case, the allocation determination unit 13 determines to allocate the service to the existing slice.

When, as a result that the allocation determination unit 13 compares the service operational costs in the existing slice with the creation costs needed when creating a new slice, the costs when creating a new slice are smaller, this means that the costs are smaller when creating a new slice in this case, the allocation determination unit 13 determines to create a new slice and allocate the service to this slice.

Note that, although the above-described costs are calculated based on the amount of electrical power in each node, it is not limited thereto. When creating a slice, the costs are determined by an operator's work in some cases, and the costs may be calculated based on the quantity of such work.

For example, when an area of application is large, a large number of available nodes are needed for constructing a slice, and a large number of man-hours are needed for defining them as a slice. The number of man-hours may be calculated as the costs by applying them to a specified formula based on available nodes.

Further, there is a case where it is determined that addition to a current slice is not possible even when the functional and performance requirements are satisfied based on the utilization rate of an available node. In such a case, the allocation determination unit 13 determines to extend an existing slice or add a new slice.

In the case where the attribute information of an existing slice that satisfies the service requirements does not exist, the allocation determination unit 13 determines whether to extend an existing slice and allocate the service to this existing slice or allocate the service to a new slice based on a result of comparison between the costs needed when extending an available node in the existing slice or extending resources in the node and the costs needed when creating a new slice.

In order to calculate the two costs described above, the allocation determination unit 13 acquires hardware information stored in the VIM 50. To be specific, the allocation determination unit 13 transmits, to the VIM 50, identification information of an available node of an existing slice as a candidate for extension and makes a request for transmitting hardware information corresponding to the identification information of this available node, and thereby acquires the hardware information.

In the case of extending an existing slice and adding the service to it, the allocation determination unit 13 calculates the proportion of resources to be used by adding the service to the resources of an available node, and multiplies this proportion by the amount of electrical power used in the available node as a whole. Then, the allocation determination unit 13 calculates the costs for extension and the costs for operation corresponding to this value by using the correspondence information between the amount of electrical power and the costs for extension and the costs for operation which is prestored in the allocation determination unit 13.

On the other hand, in the case of adding a new slice and adding the service to this slice, the allocation determination unit 13 calculates the proportion of resources to be used by adding the service to the resources of an available node, and multiplies this proportion by the amount of electrical power in the hardware as a whole. Then, the allocation determination unit 13 calculates the costs for creation and operation corresponding to this value by using the correspondence information between the amount of electrical power and the costs for creation and the costs for operation which is prestored in the allocation determination unit 13. Further, the allocation determination unit 13 calculates the value of a division loss by dividing a predetermined coefficient by the number of users (the value received when requesting a service).

When, as a result that the allocation determination unit 13 compares the costs for extending an existing slice with the costs needed when creating a new slice, the costs for extending an existing slice are smaller, this means that the costs are smaller when extending an existing slice and allocating the service to it than when creating a new slice. In this case, the allocation determination unit 13 determines to extend an existing slice and allocate the service to it.

When, as a result that the allocation determination unit 13 compares the costs needed when extending an existing slice with the costs needed when creating a new slice, the costs when creating a new slice are smaller, this means that the costs are smaller when creating a new slice. In this case, the allocation determination unit 13 determines to create a new slice and allocate the service to this slice.

After the allocation determination unit 13 determines whether to create a new slice and allocate the service, allocate the service to an existing; slice, or extend an existing slice and allocate the service, it sends the result of determination to the allocation request unit 14.

In the case where the allocation determination unit 13 determines to create a new slice and allocate the service, it sends, as the result of determination, a notification of creating a new slice and the service requirements to the allocation request unit 14.

In the case where the allocation determination unit 13 determines to allocate the service to an existing slice, it sends, as the result of determination, a notification of allocating the service to an existing slice, the slice ID of the existing slice, and the service requirements to the allocation request unit 14.

In the case where the allocation determination unit 13 determines to extend an existing slice and allocate the service, it sends, as the result of determination, a notification of extending an existing slice and allocating the service, the slice ID of the existing slice, the amount of resources to be extended, and the service requirements to the allocation request unit 14.

The allocation request unit 14 is a part that makes a request for allocating the service to the slice determined by the allocation determination unit 13. To be specific, the allocation request unit 14 transmits a result of determination by the allocation determination unit 13 described above from the allocation determination unit 13 to the NFVO 30 and makes a service allocation request. Then, the NFVO 30 allocates the service to the slice.

The allocation result notification unit 15 is a part that receives a result of allocation from the NFVO 30. To be specific, the allocation result notification unit 15 receives a result of allocation (a result indicating whether allocation is completed or allocation cannot be done) from the NFVO 30. The information indicating completion of allocation contains the service ID and the address of an access destination. In the case where the allocation result is completion of allocation, the allocation result notification unit 15 transmits the service ID and the access destination to the SBSA 70.

The NFVO 30 includes a slice attribute information transmitting unit 31, a service allocation request receiving unit 32, a storing unit 33, a resource request unit 34, a function addition request unit 35, and a service allocation unit 36. The information transmitting unit 31 receives a request for transmitting slice attribute information from the BSS/OSS 10 and then transmits information of the slice management table stored in the storing unit 33 to the BSS/OSS 10.

The service allocation request receiving unit 32 is a part that receives, from the BSS/OSS 10, a result of determination by the allocation determination unit 13 and a service allocation request. In the case where the result of determination by the allocation determination unit 13 includes "extending an existing slice and allocating the service" or "creating a new slice", the service allocation request receiving unit 32 sends information about resources to the resource request unit 34.

Further, when the service allocation request receiving unit 32 receives a notification of resource reservation from the resource request unit 34, it gives a notification of the reservation to the BSS/OSS 10. Further, the service allocation request receiving unit 32 receives functional information at specified timing. When the service allocation request receiving unit 32 receives the functional information, it sends the functional information to the function addition request unit 35.

After the service allocation unit 36 allocates the service, the service allocation request receiving unit 32 receives a result of allocation from the service allocation unit 36 and transmits the result of allocation to the BSS/OSS 10.

The storing unit 33 is a part that stores various types of tables. The storing unit 33 stores the slice management table, the service management table, and the service correspondence slice management table. FIG. 6 shows the service management table. The service management table is information based on the service requirements which the service allocation request receiving unit 32 has received from the BSS/OSS 10. The service management table has a service ID, mobility control, an access area range, a service use time, an allowed lower limit bandwidth, an allowed delay time, an allowed packet loss, a function, and an isolation flag. The service allocation unit 36 registers information where a service ID is added to the service requirements in the service management table.

FIG. 7 shows the service correspondence slice management table. The service correspondence slice management table has a service ID and a slice ID. The service allocation unit 36 registers a service ID when information is added to the service management table and a slice ID where the service is to be allocated in the service correspondence slice management table.

The resource request unit 34 is a part that makes a request for resource reservation to the VIM 50. The resource request unit 34 requests the VIM 50 to reserve resources corresponding to the amount of resources received from the service allocation request receiving unit 32. When the resource request unit 34 receives a notification of completion of resource reservation from the VIM 50, it gives the notification to the service allocation request receiving unit 32.

The function addition request unit 35 is a part that makes a request for function addition to the VNFM 40. The function addition request unit 35 requests the VNFM 40 to reserve resources corresponding to the amount of resources received from the service allocation request receiving unit 32. When the function addition request unit 35 receives a notification of completion of function addition from the VNFM 40, it gives the notification to the service allocation unit 36.

The service allocation unit 36 is a part that allocates the service. When a notification of completion of function addition is received by the function addition request unit 35, the service allocation unit 36 registers information based on the service requirements in the service management table and further registers a service ID and a slice ID in the service correspondence slice management table.

An example in which the service allocation unit 36 edits the slice management table based on determination on a slice is described hereinafter with reference to FIG. 8. The editing of the table in this example is to add a new record or modify an existing record.

In the case of the slice management table as shown in FIG. 4, when a request for extending resources of a slice with a slice ID of "slice 1" is received from the BSS/OSS 10, an available node is added, or various resources in an available node are extended. In FIG. 8(A), a server sv2, which is an available node, is added.

Further, when a request for creating a new slice is received from the BSS/OSS 10, the service allocation unit 36 adds a new record (with a slice ID of "slice 2") as shown in FIG. 8(B).

An example in which the service allocation unit 36 edits the service correspondence slice management table based on determination on a slice is described hereinafter. In the case of the service correspondence slice management table as shown in FIG. 7, when a request for creating a new slice is received from the BSS/OSS 10, a new record (a record with a service ID of "service 2" and with a slice ID of "slice 2") as shown in FIG. 9(A).

Further, when a request for allocating a service to an existing slice is received from the BSS/OSS 10, the service allocation unit 36 adds a record containing the same slice ID (with a slice ID of "slice 1) as shown in FIG. 9(B).

The VNFM 40 is described hereinafter. The VNFM 40 includes a function addition request receiving unit 41, a storing unit 42, and a function addition unit 43. The function addition request receiving unit 41 is a part that receives a function addition request from the NFVO 30. The function addition request receiving unit 41 notifies the function addition unit 43 that it has received a function addition request. Further, when the function addition request receiving unit 41 receives software related to an additional function from the NFVO 30, it sends this software also to the function addition unit 43.

When the function addition request receiving unit 41 receives a notification of completion of function addition after addition of a function by the function addition unit 43, it gives a notification of completion of function addition to the NFVO 30.

The storing unit 34 is a part (e.g., repository) that stores software. The storing unit 34 stores software related to communication which is likely to be used in common.

The function addition unit 43 is a part that installs a function. When the function addition unit 43 receives a function addition request from the function addition request receiving unit 41, it carries out installation to the target available node. At the time of installation, when the requested function is the function of software stored in the storing unit 42, the function addition unit 43 installs the software stored in the storing unit 42 to the available node. When, on the other hand, the function addition unit 43 receives software to be installed from the function addition request receiving unit 41, it installs the software. After the installation is completed, the function addition unit 43 gives a notification of completion of installation to the NFVO 30.

The VIM 50 includes a resource request receiving unit 51, a storing unit 52, a resource reservation unit 53, and a monitoring unit 54. The resource request receiving unit 51 is a part that receives a resource reservation request from the NFVO 30. When a resource request is received, the request is notified to the resource reservation unit 53. The storing unit 52 is a part that stores information about resources. The storing unit 52 stores information of a hardware table and information of a resource utilization status table.

An example of the resource utilization status table is described hereinafter with reference to FIG. 10. The resource utilization status table has a hardware name (HW name), a slice being used, allocated resources, excess resources, and a resource utilization rate.

The HW name is in for identifying hardware. The slice being used is a slice that is allocated as a slice. The allocated resources are resources that are allocated to a slice. The excess resources are resources that are not allocated to any slice. The resource utilization rate is the utilization rate of resources in a slice.

The resource reservation unit 53 is a part that reserves resources. When a notification of a resource request is received by the resource request receiving unit 51, the resource reservation unit 53 refers to the resource utilization status table and allocates a slice based on excess resources in the resource utilization status table. After reserving the resources, the resource reservation unit 53 gives a notification to the resource request receiving unit 51. The monitoring unit 54 is a part that monitors the utilization status of the NFVI 60. The monitoring unit 54 reflects a result of monitoring on the resource utilization rate.

Figure 11:
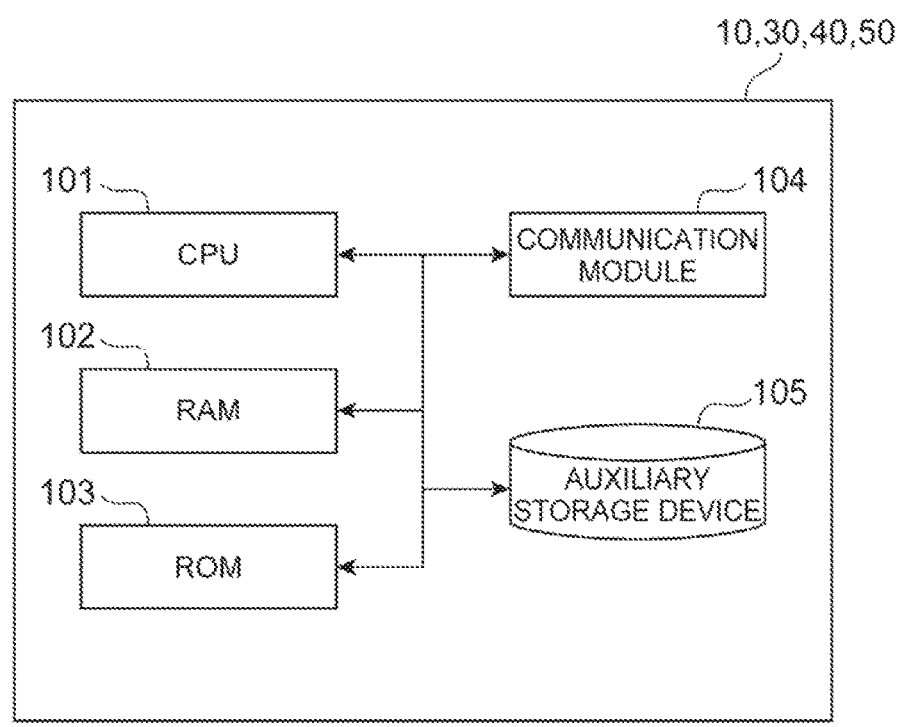

The functions related to this embodiment are described above. FIG. 11 shows the hardware configuration of a server device that implements the BSS/OSS 10, the NFVO 30, the VNFM 40 and the VIM 50. As shown in FIG. 11, the server device is configured to include a computer that has hardware such as one or a plurality of CPU 101, RAM (Random Access Memory) 102 and ROM (Read Only Memory) 103 serving as a main memory device, a communication module 104 (transmitter or receiver) for communication, and an auxiliary storage device 105 (memory) such as a hard disk. Those elements operate by a program or the like, and thereby the functions of the BSS/OSS 10, the NFVO 30, the VNFM 40 and the VIM 50 described above are implemented.

Note that, instead of executing the functions in FIG. 3 by a processor such as the CPU 101, all or some of the functions may be executed by constructing a dedicated integrated circuit (IC). For example, the above-described functions may be executed by constructing a dedicated integrated circuit fax performing image processing and communication control.

Software may be called any of software, firmware, middleware, microcode, hardware description language or another name, and it should be should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using wired technology such as a coaxial cable, an optical fiber cable, a twisted pair and a digital subscriber line (DSL) and/or wireless technology such as infrared rays, radio and microwaves, those wired technology and/or wireless technology are included in the definition of the transmission medium.

Note that the BSS/OSS 10, the NFVO 30, the VNFM 40 and the VIM 50 may be implemented by a computer system that is composed of a plurality of server devices. Further, a node different from the above-described nodes included in the system 1 may be implemented by a server device having the above-described hardware configuration. Further, some or all of the functions of the base station 80 and the SU 90 (mobile communication terminal) may be implemented using hardware such as ASIC (Application Specific Integrated Circuit), PLD (Programmable Logic. Device) and FPGA (Field Programmable Gate Array). Further, the base station 80 and the SU 90 may be implemented by a computer device that includes a processor (CPU), a communication interface for network connection, a memory and a computer-readable storage medium storing a program. In other words, the base station 80, the SU 90 and the like according to one embodiment of the present invention may function as a computer that performs processing related to the present invention.

The processor, the memory and the like are connected through a bus for communicating information. Further, the computer-readable recording medium is an appropriate storage medium such as a flexible disk, a magneto-optical disk (e.g., compact disk, a digital versatile disc, a Blu-ray (registered trademark) disc), a smartcard, a flash memory device (e.g., a card, a stick, a key drive), a ROM, an EPROM (Erasable Programmable ROM), an EEPROM (Electrically Erasable Programmable ROM), a CD-ROM (Compact Disc-ROM), a RAM, a register, a removable disk, a hard disk, a floppy (registered trademark) disk, a magnetic strip, a database, a server and the like. Further, the program may be transmitted front a network through a telecommunications line. Further, the base station 80 and the SU 90 may include an input device such as an input key and an output device such as a display.

The functional configurations of the base station 80 and the SU 90 may be implemented by the above-described hardware, may be implemented by a software module executed by a processor, or may be implemented by a combination of them. The processor causes an operation system to operate and controls a user terminal as a whole. Further, the processor reads a program, a software module and data from a storage medium to a memory and performs various processing according to them.

Note that the program may be a program that causes a computer to execute the operations described in the above-described embodiment. For example, a control unit of the mobile communication terminal may be implemented by a control program that is stored in the memory and operates on the processor, and another functional block may be implemented in the same manner. The system 1 according to this embodiment has the above-described configuration.

Figure 13:
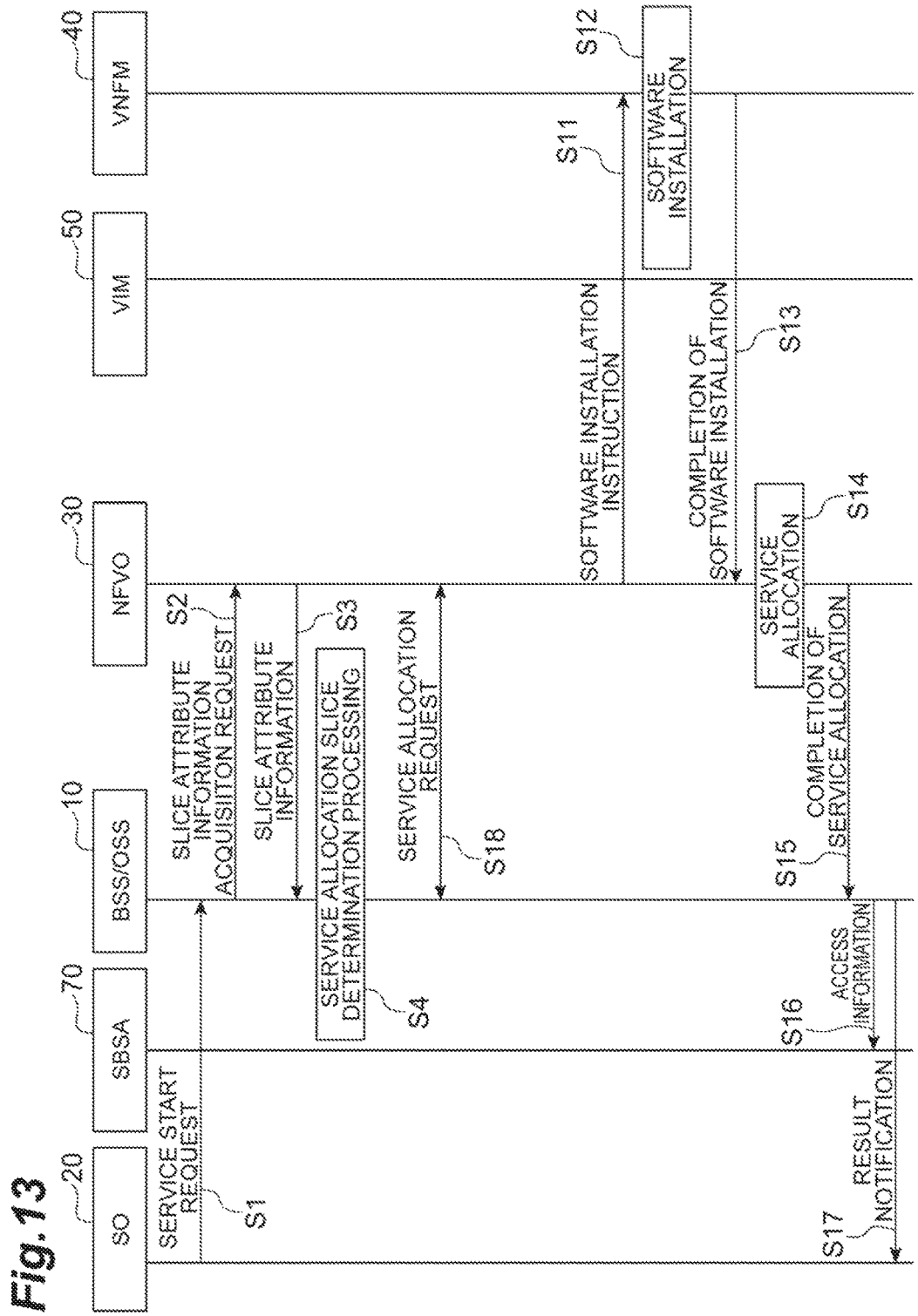
FIG. 13 is a sequence chart (2) according to an embodiment of the present invention.
Figure 14:
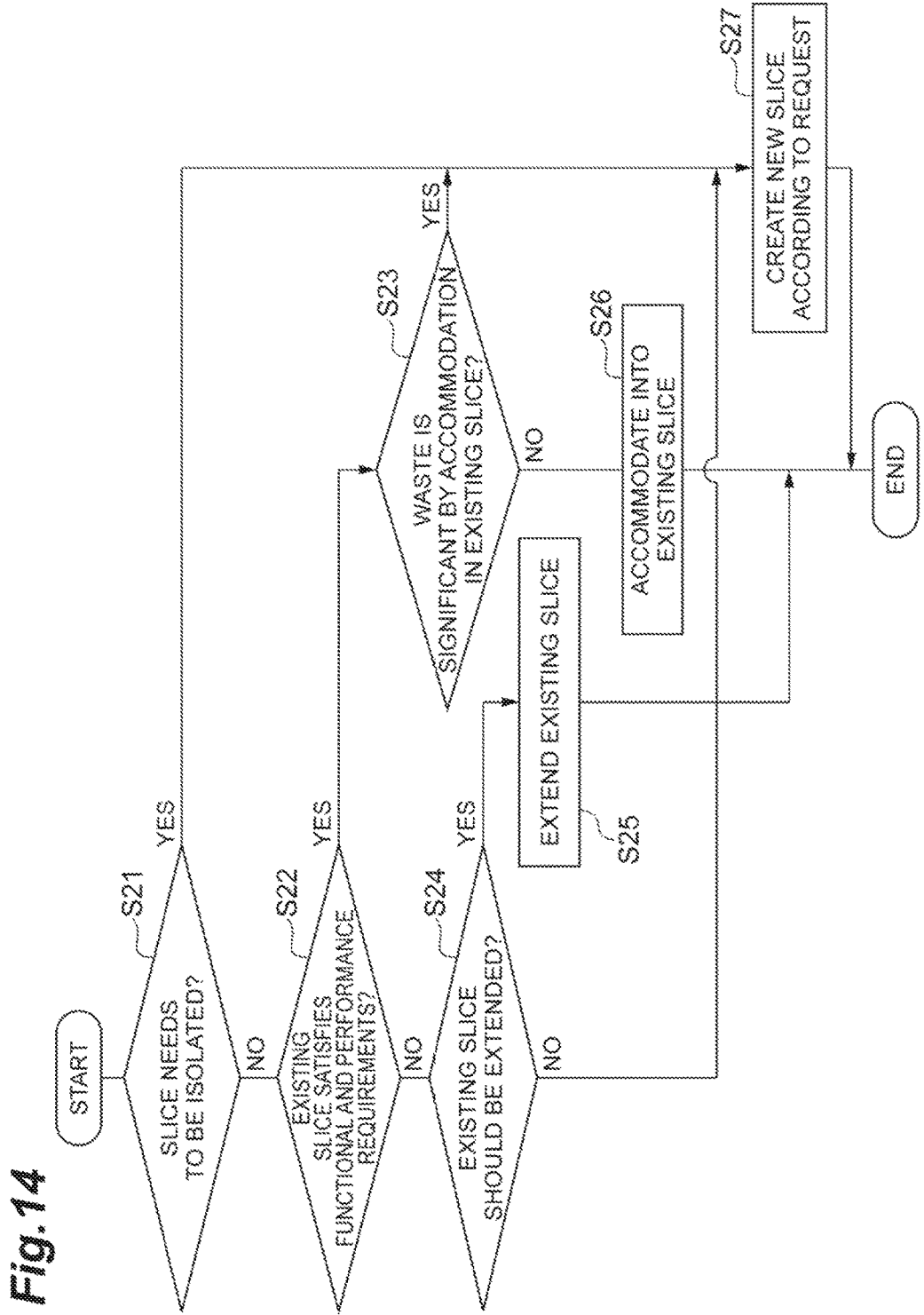
FIG. 14 is a flowchart according to an embodiment of the present invention.

A management method, which is a process executed in the system 1 according to this embodiment, is described hereinafter with reference to the sequence charts of FIGS. 12 and 13 and the flowchart of FIG. 14.

First, a process in the case where the BSS/OSS 10 determines to create a new slice or extend an existing slice and allocate a service when a service start request is made from the SO 20 is described hereinafter with reference to the sequence chart of FIG. 12.

First, when the SO 20 makes a service start request, the service request receiving unit 11 of the BSS/OSS 10 receives the service start request (Step S1). Next, the information receiving unit 12 makes an information transmission request to the NFVO 30 (Step S2), and receives slice attribute information from the NFVO 30 (Step S3). Then, the allocation determination unit 13 performs service allocation slice determination processing (Step S4). The details of the service allocation slice determination processing are described in the flowchart described below. When it is determined to extend a slice or create a new slice and allocate a service to the slice, the allocation request unit 14 makes a request for editing of a slice (extending of a slice or creation of a new slice) and allocation of the service to the NFVO 30 (Step S5). In response to this, the NFVO 30 makes a resource reservation request to the VIM 50 (Step S6).

When the VIM 50 reserves an available node and its resources (Step S7), it gives a notification of resource reservation to the NFVO 30 (Step S8). The NFVO 30 gives a notification of completion of resource reservation to the BSS/OSS 10 (Step S9). The allocation request unit 14 notifies the NFVO 30 of function information of the target service (Step S10). In response to this, the NFVO 30 gives an instruction to install software to the VNFM 40 (Step S11). In response to this, the VNFM 40 installs software (Step S12) and gives a notification of completion of software installation to the NFVO 30 (Step S13). The NFVO 30 allocates a service to the generated new slice (Step S14) and gives a notification of completion of service allocation to the BSS/OSS 10 (Step S15). The allocation result notification unit 15 of the BSS/OSS 10 transmits access information to the SBSA 70 (Step S16) and gives a notification of a result to the SO 20 (Step S17).

A process in the case where the BSS/OSS 10 determines to allocate a service to an existing slice when a service start request is made from the SO 20 is described hereinafter with reference to the sequence chart of FIG. 13.

Figure 12:
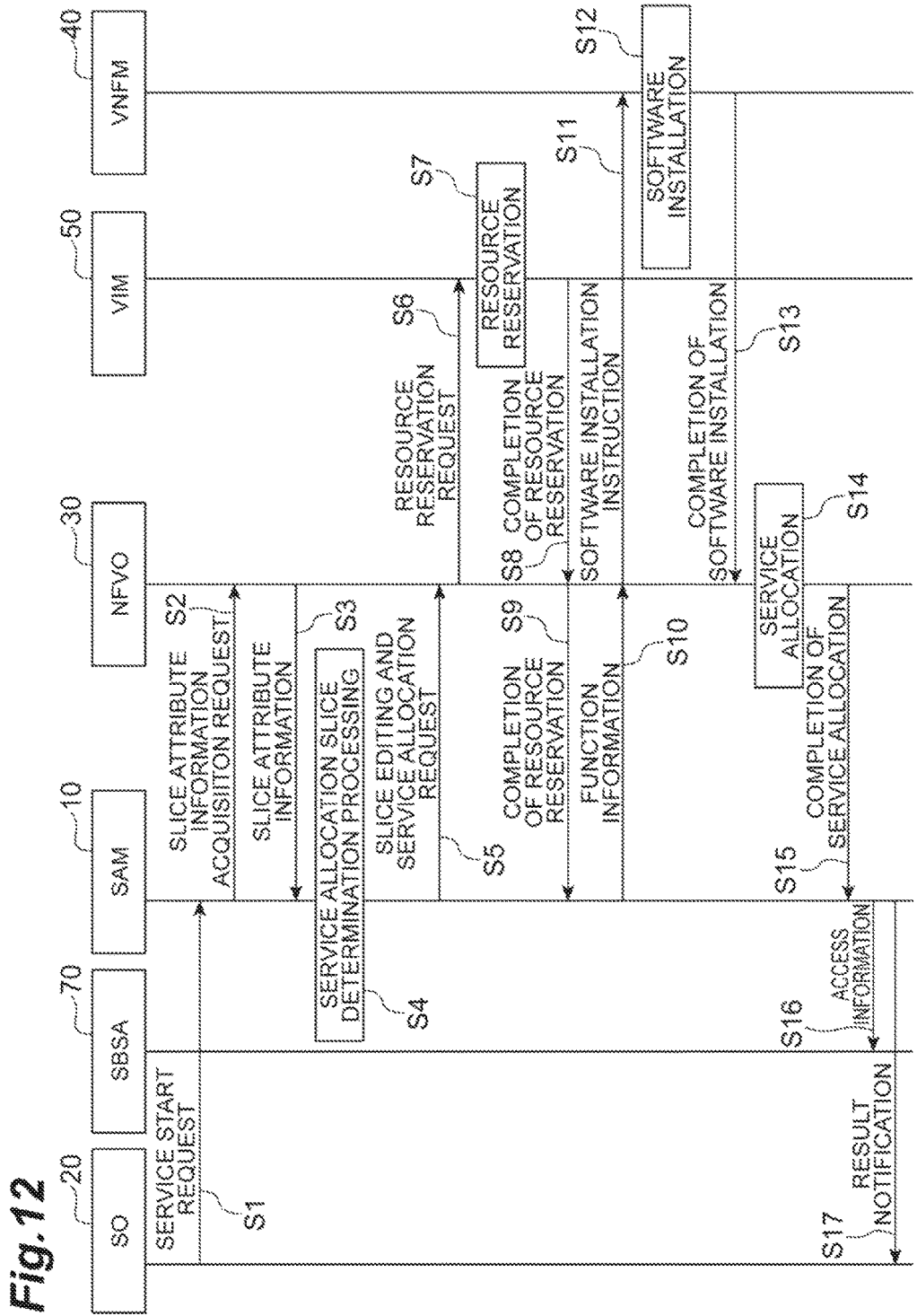
FIG. 12 is a sequence chart (1) according to an embodiment of the present invention.

The processing in Steps S1 to S4 and the processing in Steps S11 to S17 are common to those in the sequence chart of FIG. 12, and therefore the description thereof is omitted. When the allocation determination unit 13 performs the service allocation slice determination processing in Step S4, it is determined to allocate the service to an existing slice, and it gives a notification of service requirements and function information to the NFVO 30 and also makes an allocation request (Step S5a).

Then, when the NFVO 30 receives a notification of completion of installation from the VNFM 40, it performs service allocation processing to an existing slice (S14a).

The service allocation slice determination processing is described hereinafter with reference to the flowchart of FIG. 14. In the case where the service requirements include a requirement indicating isolation of a slice (Yes in Step S21), the allocation determination unit 13 determines to create a new slice and allocate the service to this slice (Step S27). Note that a request for isolation of a slice is made by request of the one who has made a service start request, and it corresponds to a request for allocation to a slice where a service is not allocated or a request for creation of a new slice.

When the service requirements does not include a requirement indicating isolation of a slice (No in Step S21), the allocation determination unit 13 determines whether an existing slice satisfies functional and performance requirements or not (Step S22), and, when it is determined that the existing slice satisfies functional and performance requirements (Yes in Step S22), and when there is significant waste by allocation of the service to the existing slice (Yes in Step S23), the process proceeds to Step S27. When, on the other hand, there is no significant waste by allocation, of the service to the existing slice (No in Step S23), the allocation determination unit 13 determines to allocate the service to the existing slice (Step S26).

When it is determined that the existing slice does not satisfy functional and performance requirements (No in Step S22), and when it is determined to extend the existing slice (Yes in Step S24), the allocation determination unit 13 determines to extend the service to the existing slice (Step S25). When it is determined not to extend the existing slice (No in Step S24), the process proceeds to Step S27.

The operations and effects of the BSS/OSS 10 according to this embodiment are described hereinafter. In the BSS/OSS 10, the service request receiving unit 11 receives the service requirements and the information indicating functions for implementing a service. Using the service requirements and the slice information, the allocation determination unit 13 determines to which of an existing slice and a new slice the service is to be allocated. The allocation request unit 14 makes a request for allocating the service to the slice determined by the allocation determination unit 13. In this case, because the BSS/OSS 10 determines to which of an existing slice and a new slice the service is to be allocated based on the service requirements and the attribute of the existing slice, it is possible to allocate the service to a slice without wasteful use of the physical resources (node) that constitute the NFVI 60 and its resources.

Further, the allocation determination unit 13 allocates a service to an existing slice on condition that the attribute of the existing slice satisfies the service requirements. In this case, because the BSS/OSS 10 allocates a service to an existing slice when the service can be added to the existing slice, it is possible to allocate the service to a slice without wasteful use of an available node and its resources compared with the case of creating a new slice each time receiving a new service request.

Further, the allocation determination unit 13 allocates a service to an existing slice when the attribute of the existing slice satisfies the service requirements and further a result of comparison between the costs needed when allocating the service to the existing, slice and the costs needed when allocating the service to a new slice satisfies specified conditions. In this case, because the BSS/OSS 10 compares the costs needed when allocating a service to an existing slice and the costs needed when allocating a service to a new slice, it is possible to prevent wasteful use of an available node and its resources.

Further, when the attribute of the existing slice does not satisfy the service requirements, the allocation determination unit 13 determines whether to extend an existing slice and allocate a service to the existing slice or allocate a service to a new slice based on a result of comparison between the costs needed when extending an available node or its resources in the existing slice and the costs needed when creating a new slice. In this case, because a slice is extended and a service is allocated in consideration of the costs for extension, it is possible to prevent wasteful use of an available node and its resources compared with the case of uniformly creating a new slice.

In the case where the service requirements include the isolation requirement, the allocation determination unit 13 determines to allocate the service to a new slice. In this case, the BSS/OSS 10 can prevent a service requesting allocation to a slice where another service is not allocated from being allocated to a slice where another service is allocated.

Note that the term "determining (or judging)" and "determining (or deciding)" used in this specification includes a variety of operations. For example, "determining" and "determining" can include calculating, computing, processing, deriving, investigating, looking up (e.g., looking up in a table, a database or another data structure), ascertaining and the like. Further, "determining" and "determining" can include receiving (e.g., receiving information), and accessing (e.g., accessing data in a memory). Further, "determining" and "determining" can include resolving, selecting, choosing, establishing, comparing and the like.

Further, the description "based on" used in this specification does not mean "based only on" unless otherwise noted. In other words, the description "based on" means both of "based only on" and "based at least on".

As long as "including", "comprising" and transformation of them are used in the present specification or claims, those terms are intended to be comprehensive like the term "comprising". Further, the term "or" used in the present specification or claims is intended not to be exclusive OR.

The term "connect", "connected" or every transformation of this term means every direct or indirect connection or coupling between two or more elements, and it includes the case where there are one or more intermediate elements between two elements that are "connected" to each other. The connection between elements may be physical connection, logical connection, or a combination of them. When used in this specification, it is considered that two elements are "connected" to each other by using one or more electric wires, cables and/or printed electric connections and, as several non-definitive and non-comprehensive examples, by using electromagnetic energy such as electromagnetic energy having a wavelength of a radio frequency region, a microwave region and an optical (both visible and invisible) region.

The mobile communication terminal can be also called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

The procedure, the sequence, the flowchart and the like in each aspect/embodiment described in this specification may be in a different order unless inconsistency arises. For example, for the method described in this specification, elements of various steps are described in an exemplified order, and it is not limited to the specific order described above.

Each aspect/embodiment described in this specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present invention is described in detail in the foregoing, it is apparent to those skilled in the art that the present invention is not restricted to the embodiment described in this specification. The present invention can be implemented as a modified and changed form without deviating from the spirit and scope of the present invention defined by the appended claims. Accordingly, the description of the present specification is given merely by way of illustration and does not have any restrictive meaning to the present invention.

Each aspect/embodiment described in this specification may be applied to LTE (Long Term Evolution), LTE-A (LTE Advanced), SUPER 3G, IMT-Advanced, 4G, 5G, FRA (Future Radio Access), W-CDMA (registered trademark), GSM (registered trademark), CDM 2000, UMB (Ultra Mobile Broadband), IEEE 802.11 (Wi-Fi), IEEE 802.16 (WiMAX), IEEE 802.20, UWB (Ultra. Wide Band), Bluetooth (registered trademark), a system using another appropriate system and/or a next generation system extended based on these systems.

REFERENCE SIGNS LIST

1 . . . system, 10 . . . BSS/OSS, 11 . . . service request receiving unit, 12 . . . slice attribute information receiving unit, 13 . . . allocation determination unit, 14 . . . allocation request unit, 15 . . . allocation result notification unit, 20 . . . SO, 30 . . . NFVO, 31 . . . slice attribute information transmitting unit, 32 . . . service allocation request receiving unit, 33 . . . storing unit, 34 . . . resource request unit, 35 . . . function addition request unit, 36 . . . service allocation unit, 40 . . . VNFM, 41 . . . function addition request receiving unit, 42 . . . storing unit, 43 . . . function addition unit, 50 . . . VIM, 51 . . . resource request receiving unit, 52 . . . storing unit, 53 . . . resource reservation unit, 54 . . . monitoring unit, 60 . . . NFVI, 70 . . . SBSA, 80 . . . base station, 90 . . . SU, 101 . . . CPU, 102 . . . RAM, 103 . . . ROM, 104 . . . communication module, 105 . . . auxiliary storage device

The invention claimed is:

1. A service allocation determination device that allocates, to a slice being a virtual network, a service using the virtual network, comprising:
  processing circuitry configured to
    receive a service request containing service requirements being functional or performance requirements in a service to be provided using the virtual network from a terminal device that provides services to various users with use of virtual networks;
    make a determination as to which of an existing slice and a new slice a service is to be allocated based on received service requirements and an attribute of an existing slice; and
    make a request for allocating a service to a slice based on the determination,
  wherein
  either the service requirements include an isolation requirement and the determination includes determining an allocation to a slice where another service is not allocated based on the service requirements, and the processing circuitry makes a request for an allocation to a slice where another service is not allocated based on the determination; or
  the service requirements do not include an isolation requirement, and the processing circuitry determines whether to allocate the service to a slice where an existing service is allocated or to a slice where an existing service is not allocated, and
  wherein
  when an attribute of an existing slice does not satisfy the service requirements, the processing circuitry determines whether to extend resources of the existing slice and allocate a service to the existing slice or allocate a service to a new slice by use of an index related to service allocation to the existing slice and an index related to service allocation to a new slice.

2. The service allocation determination device according to claim 1, wherein
  on condition that an attribute of an existing slice satisfies the service requirements, the processing circuitry allocates a service to the existing slice.

3. The service allocation determination device according to claim 1, wherein
  when an attribute of an existing slice satisfies the service requirements, the processing circuitry determines whether to allocate a service to the existing slice or allocate a service to a new slice by use of the index related to service allocation to the existing slice and the index related to service allocation to a new slice.

4. The service allocation determination device according to claim 1, wherein
  the processing circuitry determines to allocate a service received by the service request receiving means to a new slice.

5. A service allocation determination method performed in a service allocation determination device that allocates, to a slice being a virtual network logically constructed on a network infrastructure, a service using the virtual network, comprising:
  a service request receiving step of receiving a service request containing service requirements being functional or performance requirements in a service to be provided using the virtual network from a terminal device that provides services to various users with use of virtual networks;
  an allocation determination step of determining to which of an existing slice and a new slice a service is to be allocated based on service requirements received by the service request receiving step, an attribute of an existing slice, and an index related to service allocation to a slice; and
  an allocation request step of making a request for allocating a service to a slice determined by the allocation determination step,
  wherein
  either the service requirements include an isolation requirement indicating allocation to a slice where another service is not allocated, and
  a service requesting allocation to a slice where another service is not allocated is not allocated to a slice where another service is allocated, or the service requirements do not include an isolation requirement, and the service is allocated to either a slice where an existing service is allocated or to a slice where an existing service is not allocated, and
  when an attribute of an existing slice does not satisfy the service requirements, the allocation determination step determines whether to extend resources of the existing slice and allocate a service to the existing slice or allocate a service to a new slice by use of an index related to service allocation to the existing slice and an index related to service allocation to a new slice.

6. The service allocation determination method according to claim 5, wherein
  on condition that an attribute of an existing slice satisfies the service requirements, the allocation determination step allocates a service to the existing slice.

7. The service allocation determination method according to claim 5, wherein
  when an attribute of an existing slice satisfies the service requirements, the allocation determination step determines whether to allocate a service to the existing slice or allocate a service to a new slice by use of the index related to service allocation to the existing slice and the index related to service allocation to a new slice.

8. The service allocation determination method according to claim 5, wherein
  the allocation determination step determines to allocate a service received by the service request receiving step to a new slice.

* * * * *